March 5, 1940.  A. TOTTEREAU  2,192,530

TAP

Filed Nov. 14, 1938

INVENTOR
ANDRÉ TOTTEREAU.

By
ATTYS

Patented Mar. 5, 1940

2,192,530

UNITED STATES PATENT OFFICE 2,192,530

TAP

André Tottereau, Paris, France

Application November 14, 1938, Serial No. 240,300
In France November 19, 1937

2 Claims. (Cl. 226—120)

The filling of receptacles particularly those which have only one orifice of small diameter such as casks, kegs, barrels and so on requires, in order to prevent overflowing, strict attention which is a source of annoyance and causes a loss of time to the person called upon to watch such operation.

The invention has for object a tap which closes automatically when the liquid which it delivers into a receptacle reaches therein a predetermined level.

This tap or cock is characterized by the provision in the cock body of an air space which can remain external of the receptacle and comprising a movable wall such as a membrane, piston or the like upon which the increase in pressure of the air contained in this space caused by the raising of the liquid in the receptacle acts so as to displace this movable wall, such displacement being utilized for the indirect or direct control or movement of the closing member of the tap, valve, piston, plug and so on.

Figure 1:
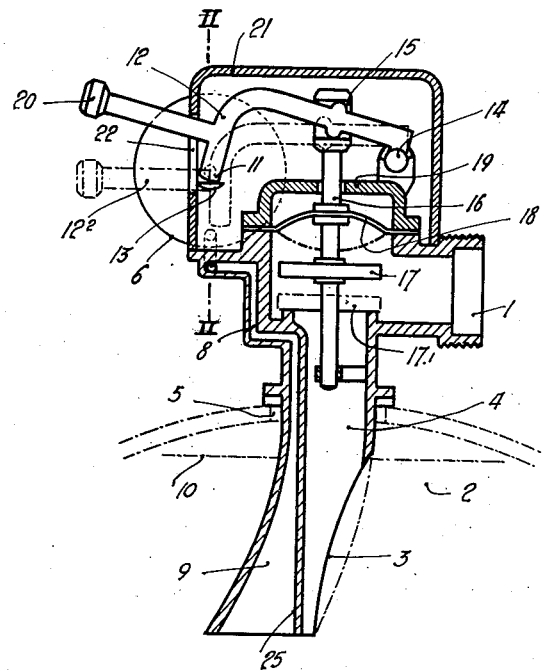
Figure 2:
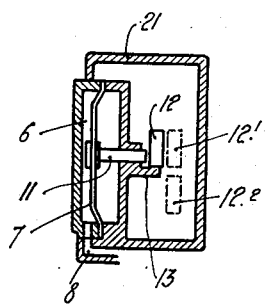
Figure 3:
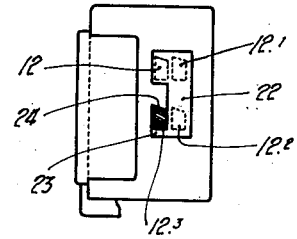

A tap constructed according to the invention is shown substantially but solely by way of example in the accompanying drawing, in which:

Figure 1 is a sectional elevation of the whole of said tap; Fig. 2 is a section taken on the line II—II of Fig. 1; Fig. 3 is a view of the left hand external face of the casing surrounding the tap.

In this tap the liquid arrives at 1 to be discharged into a receptacle 2 through the port 3 of the pipe 4 of which the diameter is appropriate to the orifice 5 of the receptacle which latter remains in communication with the atmosphere.

An air space 6 is provided in the tap; it comprises a flexible membrane 7 and a conduit 8 connecting it to a chamber 9 of a suitably determined volume.

A lever 12 articulated on the ball joint 14 passes through the gap 15 of a spindle 16 integral with a valve 17 preferably made of a plastic material (rubber, fibre and so on); this lever 12 rests, in its initial position, on a stationary support 13.

When the liquid, in the receptacle, reaches the level 10, it compresses the air in the spaces 9, 8 and 6. Through the effect of this increase in pressure the flexible membrane 7 becomes deformed and through the intermediary of the slide 11 exerts on the lever 12 a thrust perpendicularly to the plane of Figure 1.

Under the influence of this thrust the lever 12 moves in a horizontal plane to take up the position 12¹ and being, at that moment, deprived of the bearing from the support 13, takes up, by gravity, the position 12², carrying along in its fall the spindle 16 and bringing the valve 17 onto its seat at 17¹.

So as to avoid in the open position that the liquid shall unintentionally carry along the valve 17, the spindle 16 of the valve is connected to a flexible membrane 18 tightened hermetically on the cock body by means of the cover 19.

This membrane receives at all instants the upward pressure and in consequence balances the thrust of liquid on the valve. After the closing of the valve this arrangement allows likewise an easy manipulation of the latter by means of the handle 20 of lever 12 no matter what may be the upward pressure.

In addition, the membrane 18 joined to the cock body and on the spindle 16 advantageously replaces a gland.

As regards the chamber 6 the flexible membrane 7 similarly ensures watertightness and serves as a gland.

The tap is encased by a casing 21 which protects the external parts. For the passage of the lever 12, this casing comprises an opening 22 designed so as to permit the latter to take up its successive positions 12, 12¹, 12². This opening 22 also comprises a trapezoidal recess 23 corresponding to the section, of the same shape, of the branch of the lever 12 which passes through the casing and which permits, after the closing of the tap, if desired, to bring the lever from the posiiton 12² to the position 12³ by hand. For this purpose, the plastic valve 17 must be slightly crushed upon its seat through the intermediary of lever 12. It therefore exerts on the latter a vertical reaction from the bottom to the top which applies it to the upper inclined face 24 of the recess 23.

The lever 12 and the valve 17 are thus locked in their position of closure and the tap cannot be opened except after a fresh manual operation on the handle 20 of lever 12.

The chamber 9 is provided with a sufficient volume so that the liquid rising in this space creates a fairly high reduction in the volume of air comprised in the spaces 6, 8 and 9 and in consequence a suitable variation of the pressure of this air.

To provide the chamber 9 and ensure for the liquid a vertical passage in the pipe 4 of which the section is limited by the diameter of the orifice of the receptacle, this pipe is slightly curved. The wall 25 is in addition made in the form of a gutter. This arrangement permits, if desired, of partially withdrawing the pipe 4 from the receptacle and verifying the discharge of liquid without any risk of splashings from the latter.

The movable wall formed, in the example illustrated, by a flexible membrane could be formed by a piston or other similar member.

The tap constructed in conformity with the invention has the following essential advantages which constitute the characteristic features.

1. Facility of filling without supervision or risk of overflowing, receptacles of all kinds and in particular those which have only an orifice of small diameter such as casks, kegs, barrels and so on.

2. Absence of all joints between the receptacle and the tap.

3. Facility of arranging, for the direct or indirect operation of the closing member a force practically as high as desired (this force is in fact proportional to the surface of the controlling membrane and this membrane disposed outside the receptacle can be suitably dimensioned).

4. Excellence of the transmission of power obtained between the liquid and the membrane controlling the lever, this transmission being ensured in a constant manner and which cannot be put out of order, by the air without the use of any delicate part susceptible of getting out of order such as a float, pivot, bell crank and so on.

5. Elimination of all glands.

6. Elimination of any contact between the liquid and the parts effecting the closure.

7. Safety of operation and reduction in upkeep resulting from the advantages under 2 to 6.

8. Property of the valve of being maintained in the closed position by the weight itself of the lever the power of which is increased by the articulation system.

9. Facility of a very easy complementary filling by manual operation of a lever and faculty of simultaneous control of the filling with splashings of the liquid.

10. Facility of a robust locking of the tap, and an easy transport of the latter with the feed piping.

11. Possibility of a construction requiring no precision work by reason of the high power available for controlling the closure.

12. Complete independence of the operation and tightness as regards the upward pressure.

I claim:

1. Automatically closing tap for filling receptacles comprising in combination a cock body having an inlet for the supply of liquid and a discharge outlet for delivering said liquid into the receptacle, said outlet comprising a tube extending into said receptacle, a seating on the upper end of said tube, a valve body for closing said tube and adapted to be engaged against said seating, a spindle carrying said valve, a cover over said cock body, an aperture in said cover, said spindle passing through said aperture, a first flexible membrane mounted on said spindle below said cover, and clamped at its periphery between said cock body and said cover, a guide on the upper end of said spindle, a mounting on said cover, a lever having one end pivotally mounted on said mounting, and passing through said guide, an annular chamber partly surrounding the tube comprising the discharge outlet, an air chamber externally of said cover, a conduit connecting said annular chamber and said air chamber, a second flexible membrane arranged in said air chamber, a slide fixed to said membrane and passing through said air chamber, a support externally of said air chamber for supporting the lever passing through the guide on the spindle when the said receptacle is being filled, said slide moving to push said lever off said support, thereby to lower said spindle and apply said valve to said seating to close the tap automatically when said receptacle is filled, said slide moving under the pressure of the air compressed in said annular chamber when the level of the liquid in the receptacle rises and forces said air through said conduit and into said air chamber to influence said second flexible membrane, said lever having a weight at its free end to enable it to lower said spindle when it is pushed from said support by said slide.

2. Automatically closing tap as specified in claim 1, comprising a casing surrounding said cock body and housing said air chamber, and an aperture in said casing through which said lever passes, said aperture being shaped to allow said lever to be locked in position by hand to maintain said valve on said seating to keep said tap closed.

ANDRÉ TOTTEREAU.